United States Patent
Ghai

(10) Patent No.: US 9,986,472 B2
(45) Date of Patent: May 29, 2018

(54) SYSTEM AND METHOD FOR CONFIGURING A UNIVERSAL DEVICE TO PROVIDE DESIRED NETWORK HARDWARE FUNCTIONALITY

(71) Applicant: BENU NETWORKS, INC, Billerica, MA (US)

(72) Inventor: Rajat Ghai, Sandwich, MA (US)

(73) Assignee: BENU Networks, Inc., Billerica, MA (US)

(*) Notice: Subject to any disclaimer, the term of this patent is extended or adjusted under 35 U.S.C. 154(b) by 458 days.

(21) Appl. No.: 14/523,277

(22) Filed: Oct. 24, 2014

(65) Prior Publication Data
US 2015/0120890 A1    Apr. 30, 2015

Related U.S. Application Data

(60) Provisional application No. 61/895,464, filed on Oct. 25, 2013, provisional application No. 61/924,438, filed on Jan. 7, 2014.

(51) Int. Cl.
*G06F 15/177*    (2006.01)
*H04W 36/00*    (2009.01)
(Continued)

(52) U.S. Cl.
CPC ..... *H04W 36/0066* (2013.01); *H04L 41/0816* (2013.01); *H04L 41/0886* (2013.01); *H04W 48/17* (2013.01); *H04W 36/14* (2013.01)

(58) Field of Classification Search
CPC . H04W 36/0066; H04W 36/14; H04W 48/17; H04W 84/12; H04L 41/0816; H04L 41/0886; H04L 67/10
See application file for complete search history.

(56) References Cited

U.S. PATENT DOCUMENTS 8,661,434 B1 * 2/2014 Liang .................. G06F 9/45558
                                                709/220
8,804,733 B1 * 8/2014 Safrai ..................... H04L 49/10
                                                370/392
(Continued)

FOREIGN PATENT DOCUMENTS

WO    WO 2015/061698    4/2015
WO    WO 2015/061704    4/2015

OTHER PUBLICATIONS

Hill et al., "MICA: A Wireless Platform for Deeply Embedded Networks" IEEE Nov.-Dec. 2002., Retrieved on [Dec. 29, 2014]. Retrieved from: <URL: http://www.eecs.berkeley.edu/-culler/cs294-f03/papers/micaarch> entire document.
(Continued)

*Primary Examiner* — Jonathan A Bui
(74) *Attorney, Agent, or Firm* — Scan D. Detweiler, Esq.; Morse, Barnes-Brown & Pendleton, P.C.

(57) ABSTRACT

A method and system for automatically configuring and transforming a universal device into a feature specific device to provide desired network hardware functionality for a plurality of different conventionally single purpose devices. The universal device receives data configured for handling by a network hardware device capable of providing desired network hardware functionality. Based on the data received, the universal device identifies the desired network hardware functionality from network hardware functionalities. The universal device selects one or more virtual ports capable of providing the desired network hardware functionality. The universal device automatically configures and transforms itself into a feature specific device to provide the desired network hardware functionality by implementing the selected one or more virtual ports to handle the data received.

18 Claims, 13 Drawing Sheets

(51) Int. Cl.
  *H04L 12/24* (2006.01)
  *H04W 48/00* (2009.01)
  *H04W 36/14* (2009.01)

(56) References Cited

U.S. PATENT DOCUMENTS

| | | | |
|---|---|---|---|
| 8,818,329 | B2 | 8/2014 | Udeshi |
| 9,025,579 | B2 | 5/2015 | Kwon |
| 9,198,021 | B2 | 11/2015 | Tomici et al. |
| 9,294,411 | B2 * | 3/2016 | Hamdi .................. H04L 45/60 |
| 2006/0104262 | A1 | 5/2006 | Kant et al. |
| 2007/0205881 | A1 | 9/2007 | Breed |
| 2008/0205342 | A1 | 8/2008 | Radhakrishnan et al. |
| 2009/0262733 | A1 | 10/2009 | Olson |
| 2009/0285175 | A1 | 11/2009 | Nix |
| 2010/0054260 | A1 * | 3/2010 | Pandey .................. H04L 49/00 370/395.53 |
| 2010/0069035 | A1 | 3/2010 | Johnson |
| 2011/0004876 | A1 | 6/2011 | Wu et al. |
| 2012/0063301 | A1 | 3/2012 | Schel |
| 2012/0230293 | A1 | 9/2012 | Grinshpun et al. |
| 2012/0300772 | A1 | 11/2012 | Manzella et al. |
| 2013/0097674 | A1 | 4/2013 | Jindal et al. |
| 2013/0138814 | A1 | 5/2013 | Kotecha |
| 2013/0142095 | A1 | 6/2013 | Calcev et al. |
| 2013/0204987 | A1 | 8/2013 | Patani et al. |
| 2013/0339498 | A1 | 12/2013 | Johnson |
| 2014/0108632 | A1 * | 4/2014 | Narasimha ............. H04L 45/38 709/223 |
| 2014/0148152 | A1 | 5/2014 | Periyalwar et al. |
| 2014/0160937 | A1 | 6/2014 | Richards et al. |
| 2014/0213219 | A1 | 7/2014 | Mohebbi et al. |
| 2014/0226523 | A1 * | 8/2014 | Deshpande ............ H04L 49/70 370/254 |
| 2014/0248862 | A1 | 9/2014 | Periyalwar et al. |
| 2014/0269610 | A1 | 9/2014 | Hiben et al. |
| 2015/0033222 | A1 * | 1/2015 | Hussain ............. G06F 9/45533 718/1 |
| 2015/0117409 | A1 | 4/2015 | Ghai |

OTHER PUBLICATIONS

Network Functions Virtualisation—An Introduction, Benefits, Enablers, Challenges & Call for Action. Oct. 22-24, 2012 at the "SDN and OpenFlow World Congress", Darmstad-Germany.
International Search Report for International Application PCT/US2014/062197, dated Feb. 9, 2015.
International Search Report for International Application PCT/US2014/062205, dated Feb. 3, 2015.
Non-Final Office Action for U.S. Appl. No. 14/523,298 (listed on SB-08 as US 2015-0117409), dated Mar. 11, 2016.
Notice of Allowance for U.S. Appl. No. 14/523,298, dated Jul. 21, 2016.

* cited by examiner

SYSTEM AND METHOD FOR CONFIGURING A UNIVERSAL DEVICE TO PROVIDE DESIRED NETWORK HARDWARE FUNCTIONALITY

CROSS-REFERENCE TO RELATED APPLICATIONS

This application claims priority to, and the benefit of, U.S. Provisional Application No. 61/895,464, filed Oct. 25, 2013 and U.S. Provisional Application No. 61/924,438, filed Jan. 7, 2014, for all subject matter contained in both applications. The disclosures of said provisional applications are hereby incorporated herein by reference in their entirety.

FIELD OF THE INVENTION

The present invention relates to a network system suitable for providing various network hardware functionalities, and more particularly to a system utilizing a universal device that automatically configures and transforms itself into a feature specific device to provide one or more desired network hardware functionalities of a plurality of possible hardware functionalities.

BACKGROUND OF THE INVENTION

The conventional network appliance approach includes a number of devices each having a specific single function or purpose. Such devices may include a message router, CDN, session border controller, WAN acceleration, DPI, firewall, carrier grade NAT, tester/QoE monitor, SGSN/GGSN, PE Router, BRAS, and radio access network nodes. Each device requires a separate software installation. In a mobile network operator example of the conventional network appliance approach, a number of devices are combined to handle or process each type of data signal. For example, for a 4G (3G LTE/SAE) signal, an eNodeB, serving gateway or mobility management entity (MME), and SAE Anchor or 3GPP Anchor may be required. For Femtocell, an FAP, security gateway, and femto gateway may be required. For 3G/3.5G, a NodeB, RNC, MSC or SGSN or GGSN may be required. These systems (4G, femtocell, or 3G/3.5G) may be in communication with an IMS system. Each of these devices are required to provide complete single network hardware functionality. Each of these devices is conventionally a single purpose device.

SUMMARY

There is a need for a universal network hardware device that automatically configures and transforms itself into a feature specific device to process each of the various network data signal types, and perform the necessary functions of each of the conventional single purpose network hardware devices. The present invention combines cloud processing infrastructure or a cloud computing infrastructure with purpose built networking hardware. The system and method of the present invention can make use of cloud technologies, and can result in efficient use of hardware resources, cost effective scalability due to elastic system, and agile service orchestration. The present invention is directed toward further solutions to address this need, in addition to having other desirable characteristics.

In accordance with an embodiment of the present invention, a computer-implemented method for automatically configuring and transforming a universal device into a feature specific device to provide desired network hardware functionality includes the universal device receiving data configured for handling by a network hardware device capable of providing the desired network hardware functionality. Based on the data received, the universal device identifies the desired network hardware functionality from a plurality of network hardware functionalities. The universal device selects one or more virtual ports from a plurality of virtual ports. The selected one or more virtual ports being capable of providing the desired network hardware functionality. The universal device automatically configures and transforms itself into a feature specific device to provide the desired network hardware functionality by implementing the selected one or more virtual ports to handle the data received.

In accordance with one aspect of the present invention, implementing the selected one or more virtual ports includes routing the data through the selected one or more virtual ports for handling to provide the desired network hardware functionality.

In accordance with one aspect of the present invention, the plurality of virtual ports include a Generic Routing Encapsulation (GRE), S1-c, S1-u, S3, S4, S5, S8, S9, S10, S11, IP Security (IPSec), Transport Layer Security (TLS), Gx, Gy, S2a, SGi, or Dynamic Host Configuration Protocol (DHCP).

In accordance with aspects of the present invention, the universal device creates a workflow pipeline table. In one aspect, prior to the step of the universal device automatically configuring and transforming itself, the universal device binds the selected one or more virtual ports to the workflow pipeline table. In another aspect, the workflow pipeline table includes a plurality of rules relating to particular actions in controlling a use of the selected one or more virtual ports. In another aspect, the workflow pipeline table includes a plurality of data collected statistics relating to the data received by the universal device.

In accordance with one aspect of the present invention, the desired network hardware functionality includes a Trusted Wireless Access Gateway (TWAG), Heterogeneous Network Gateway (HetNet GW), Serving Gateway (SGW), Virtual Private LAN Service Gateway (VPLS GW), Mobility Management Entity (MME), Femto Gateway, Serving GPRS Support Node (SGSN), or Gateway GPRS Support Node (GGSN).

In accordance with one aspect of the present invention, the universal device is a network interface card. In another aspect, the universal device is a stand-alone network virtualization hardware device.

In accordance with aspects of the present invention, the step of the universal device automatically configuring and transforming itself into a feature specific device to provide the desired network hardware functionality further comprises programming the universal device using open programming language. In another aspect, the step of the universal device automatically configuring and transforming itself into a feature specific device to provide the desired network hardware functionality further comprises programming one or more nodes.

In accordance with an embodiment of the present invention, a universal device hardware includes a communication interface configured to receive data configured for handling by a network hardware device having desired network hardware functionality. The universal device includes a data storage component configured to store a plurality of virtual ports. The universal device selects one or more virtual ports from the plurality of virtual ports. The selected one or more virtual ports being capable of providing the desired network hardware functionality. The universal device automatically implements the selected one or more virtual ports, configuring and transforming the universal device into a feature specific device to provide the desired network hardware functionality. A determination of which of the one or more virtual ports is implemented is based on the configuration of the data received at the communication interface.

In accordance with an embodiment of the present invention, a system for automatically configuring and transforming a universal device into a feature specific device to provide desired network hardware functionality includes a receiving module configured to receive data that is configured for handling by a network hardware device capable of providing the desired network hardware functionality. The system includes a functionality module configured to identify, based on the data received, the desired network hardware functionality from a plurality of network hardware functionalities. The functionality module is configured to select one or more virtual ports capable of providing the desired network hardware functionality. A virtual connect module is configured to automatically configure the universal device to provide the desired network hardware functionality by implementing the selected one or more virtual ports to handle the data received by providing the desired network hardware functionality. The receiving module, the functionality module, and the virtual connect module are executed by a plurality of processors comprised in a cloud computing infrastructure. The system automatically configures and transforms the universal device into the feature specific device to provide desired network hardware functionality.

In accordance with an embodiment of the present invention, a software application implemented method for automatically configuring and transforming a universal device into a feature specific device to provide desired network hardware functionality includes the universal device receiving data configured for handling by a network hardware device capable of providing the desired network hardware functionality. A software application executes on a processor to identify, based on the data received, the desired network hardware functionality from a plurality of network hardware functionalities. The software application executes on a processor to select one or more virtual ports capable of providing the desired network hardware functionality. The software application executes on a processor to automatically configure and transform the universal device into a feature specific device to provide the desired network hardware functionality by implementing the selected one or more virtual ports to handle data received. At least a portion of the software application is executed by a plurality of processors comprised in a cloud computing infrastructure.

In accordance with aspects of the present invention, the software application executes on a processor to create a workflow pipeline table. The workflow pipeline table includes a plurality of entries. In one aspect, the step of the software application executing on a processor to create the workflow pipeline table includes the software application utilizing a control protocol to create rules and the workflow pipeline table. In another aspect, the software application executing on a processor binds the workflow pipeline table to the selected one or more virtual ports.

BRIEF DESCRIPTION OF THE FIGURES

These and other characteristics of the present invention will be more fully understood by reference to the following detailed description in conjunction with the attached drawings, in which.

DETAILED DESCRIPTION

Figure 1:
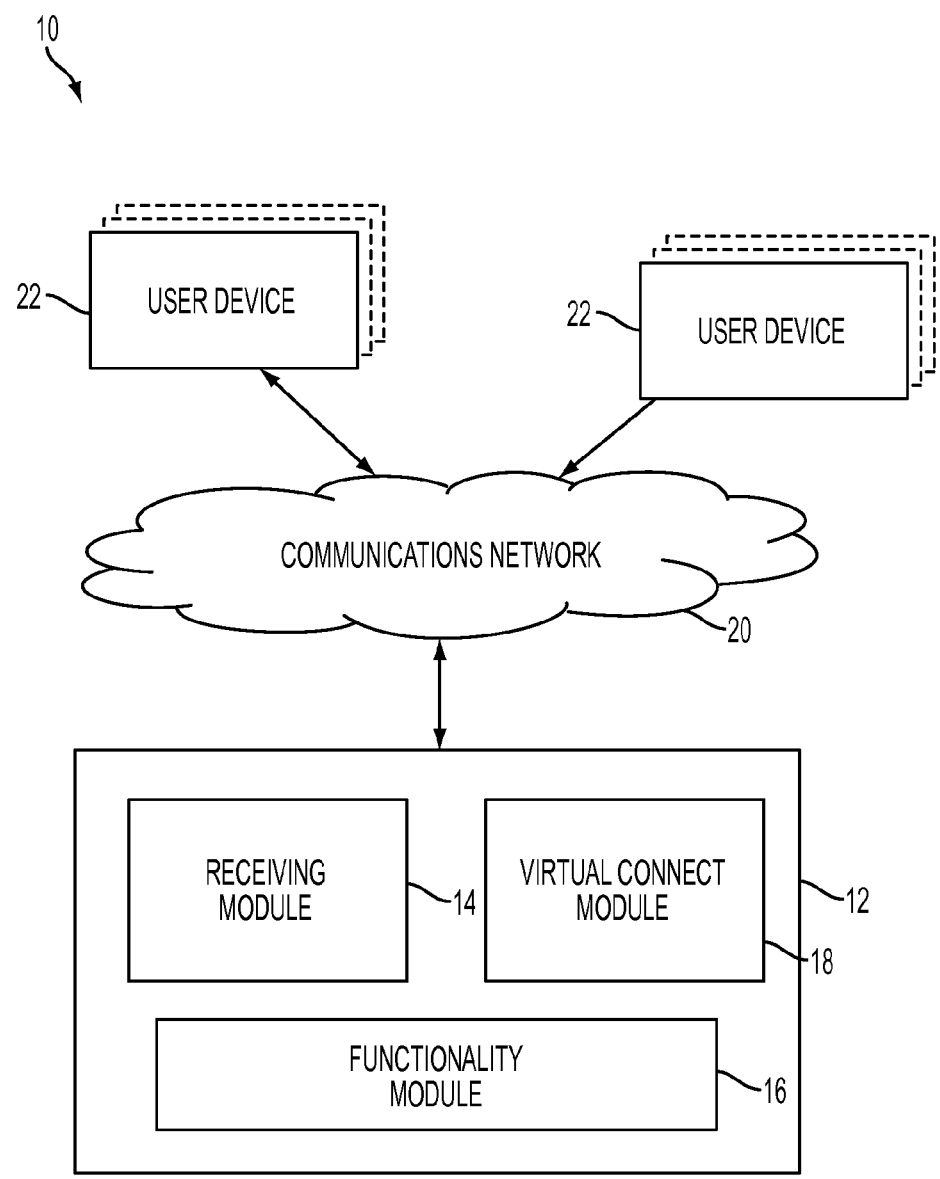
FIG. 1 is a diagrammatic illustration of a system for configuring and transforming a universal device to provide desired network hardware functionality, according to an embodiment of the present invention.

FIGS. 1 through 11, wherein like parts are designated by like reference numerals throughout, illustrate a method and system for automatically configuring and transforming a universal device into a feature specific device to provide desired network hardware functionality according to the present invention. Although the present invention will be described with reference to the figures, it should be understood that many alternative forms can embody the present invention. One of skill in the art will additionally appreciate different ways to alter the parameters disclosed, such as the size, shape, or type of elements or materials, in a manner still in keeping with the spirit and scope of the present invention.

FIG. 1 depicts a system 10 for automatically configuring and transforming a universal device 12 into a feature specific device to provide desired network hardware functionality. The system 10 includes a receiving module 14 configured to receive data for handling by a network hardware device. The system 10 includes a functionality module 16 configured to identify, based on the data received, the desired network hardware functionality from a number of network hardware functionalities. The functionality module 16 is configured to select virtual port(s) capable of providing the desired network hardware functionality. A virtual connect module 18 is configured to automatically configure and transform the universal device 12 into a feature specific device to provide the desired network hardware functionality by implementing the selected one or more virtual ports to handle the data received by providing the desired network hardware functionality. In an illustrative example utilizing the system 10, the data is sent from one or more user devices 22 (e.g., mobile phone, laptop) via a communications network 20 and is received by the receiving module 14 of the universal device 12. The receiving module 14, the functionality module 16, and the virtual connect module 18 may be executed by processors in a cloud computing infrastructure.

Figure 2:
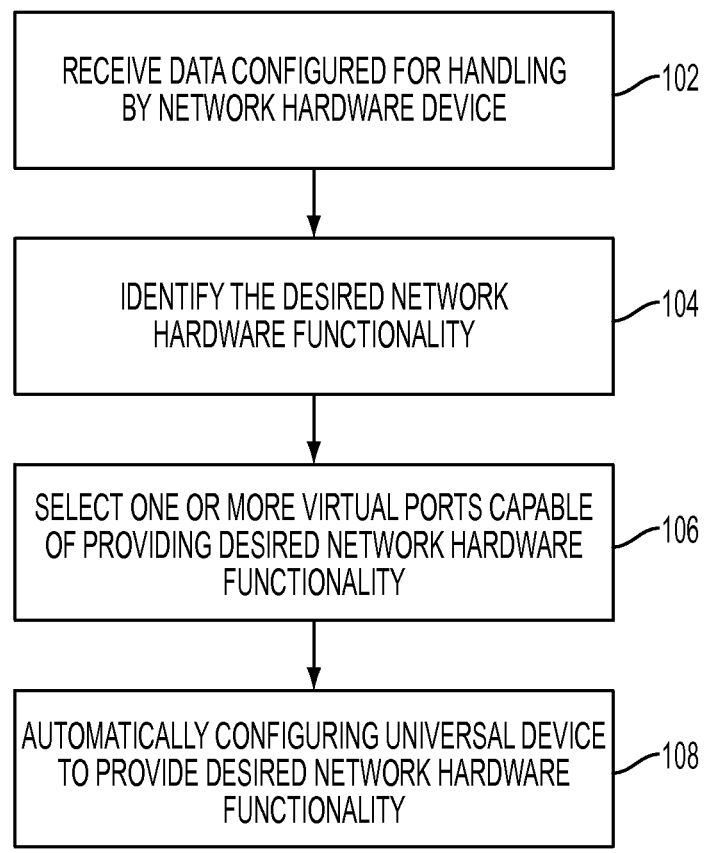
FIG. 2 is a flow chart illustration of a method for configuring and transforming a universal device to provide desired network hardware functionality, according to an embodiment of the present invention.

FIG. 2 depicts a flow chart displaying the steps for configuring the universal device 12 to provide desired network hardware functionality. In step 102, data configured for handling by a network hardware device is received. Based on the data received, the universal device 12 identifies the desired network hardware functionality from a number of possible network hardware functionalities (step 104) which prior to the present invention were conventionally handled by single purpose network hardware devices. In step 106, the universal device 12 selects specific virtual port(s) from a stored group of virtual ports, the selected virtual ports being capable of providing the desired network hardware functionality. The universal device 12 automatically configures and transforms itself into a feature specific device to provide the desired network hardware functionality by implementing the selected virtual port(s) to handle the data received (step 108). Step 108 can include programming the universal device 12 using open programming language. In accordance with aspects of the present invention, step 108 can include programming one or more nodes such that the nodes are programmable and reprogrammable such that control of the universal device 12 can be manipulated to suit any desired network hardware functionality.

In accordance with aspects of the present invention, the flowchart shown in FIG. 2 can be performed by execution of a software application. The software application executes on one or more processors to identify, based on the data received, the desired network hardware functionality from a list of network hardware functionalities. The software application can execute on a processor to select one or more virtual ports capable of providing the desired network hardware functionality. The software application can execute on a processor to automatically configure and transform the universal device 12 into a feature specific device to provide the desired network hardware functionality by implementing the selected one or more virtual ports to handle data received. A portion, or all, of the software application can be executed by processors comprised in a cloud computing infrastructure.

Figure 3:
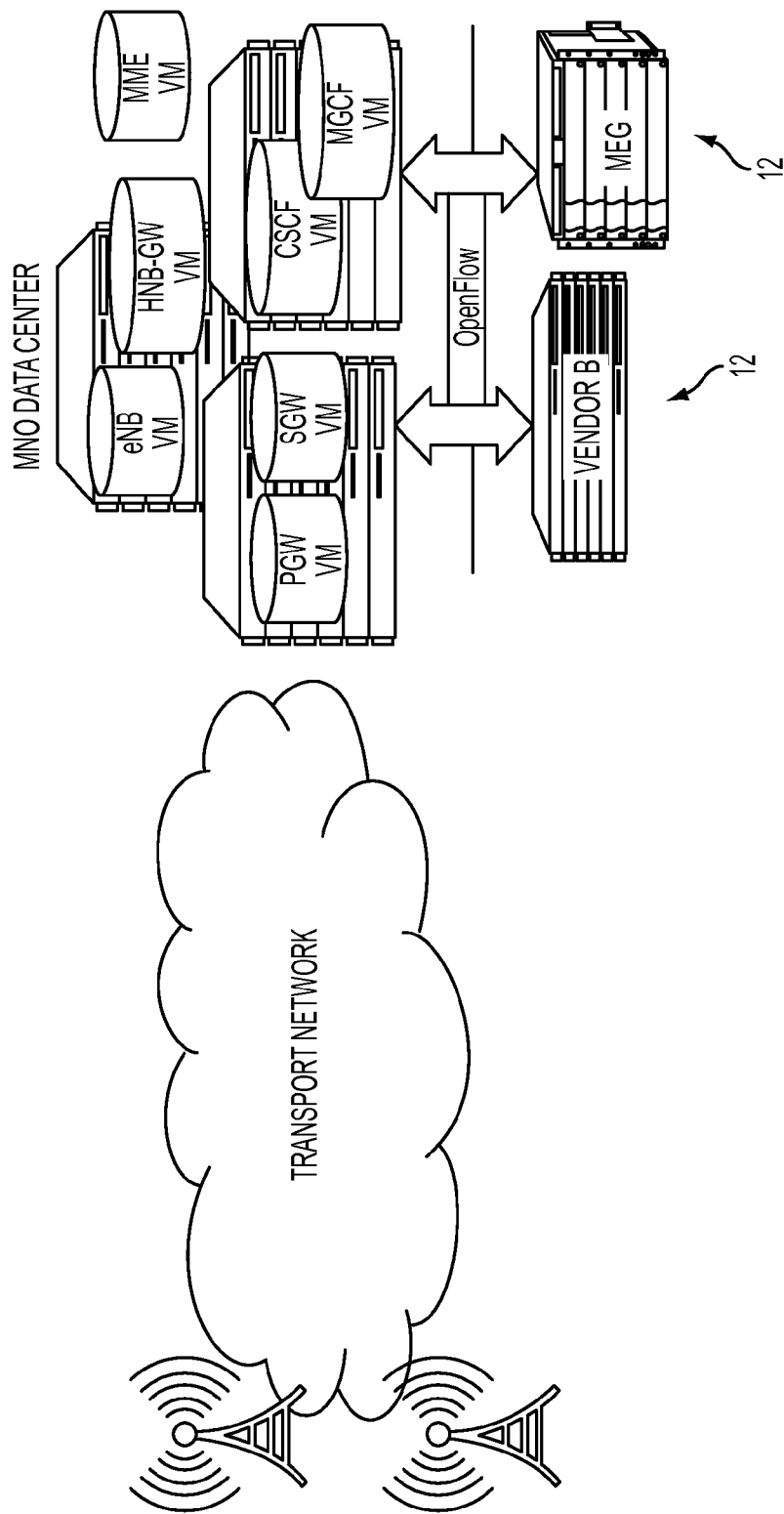
FIG. 3 is a schematic of an example universal device in use as an mobile network operator (MNO) data center, according to one aspect of the present invention.

FIG. 3 depicts an example universal device 12 in use as a mobile network operator (MNO) data center. An MNO data center conventionally includes a combination of servers controlled by wireless service providers or mobile network carriers to provide content hosting and web optimization services. In general, the MNO data center controls the flow of data over telecommunication networks. In this example, data is received via a transport network to the universal device 12 that functions as the MNO data center. The universal device 12 is enabled via a cloud computing infrastructure to provide network hardware functionality as a number of virtual machines (e.g., eNB, PGW, SGW, HNB-GW, CSCF, MGCF, or MME). This allows the universal device 12 to provide various network hardware functionalities. Openflow (communications protocol giving access to the forwarding plane or data plane) occurs between the virtual machines in the cloud computing infrastructure and the software in the hardware of the universal device 12.

Figure 4A:
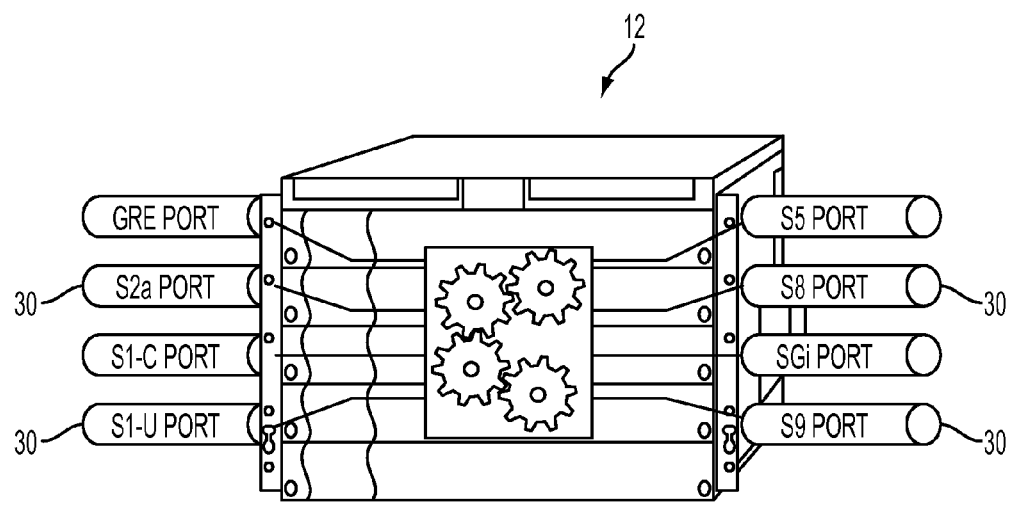
FIG. 4A is a schematic illustration of a universal device and optional virtual ports, according to one aspect of the present invention.

FIG. 4A depicts one example of a universal device 12 and optional virtual ports 30 that can be configured. The virtual ports 30 can be telecommunication ports or network protocols. The universal device 12 is capable of configuring the following virtual ports 30: Generic Routing Encapsulation (GRE), S1-c (S1AP), S1-u (GTP), S3 (GTP), S4 (GTP), S5 (GTP), S8, S9 (Diameter), S10, S11 (GTP), IP Security (IPSec), S2a, Transport Layer Security (TLS), Gx, Gy, S2a, Dynamic Host Configuration Protocol (DHCP), SGi, or the like. Those of skill in the art will appreciate that the aforementioned list of virtual ports is by no means intended to be limiting of the invention, as multiple different virtual ports of different configurations are possible for use in conjunction with the present invention. Implementation of selected virtual ports 30 includes routing data through the selected ports 30 to provide the desired network hardware functionality.

Figure 4B:
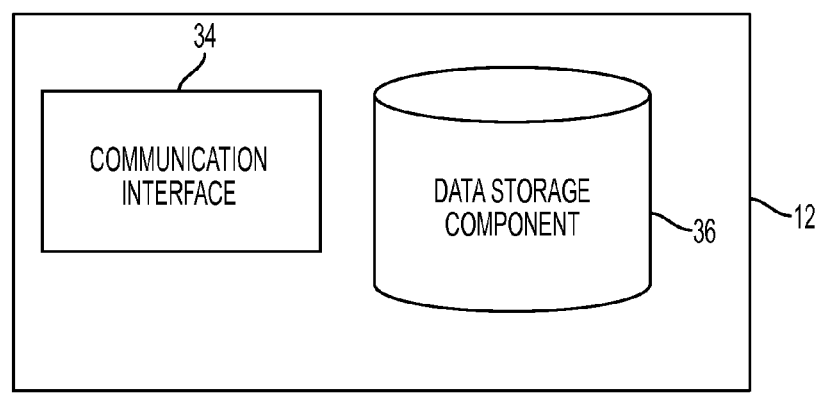
FIG. 4B is another schematic illustration of the universal device, according to one aspect of the present invention.

FIG. 4B depicts a schematic of the universal device 12. The universal device 12 can include a communication interface 34 configured to receive data configured for handling by a network hardware device. The communication interface 34 can take the form of one or more different physical hardware configurations, such as a peripheral component interconnect (PCI), Ethernet RJ45 jack, and other conventionally known interfaces as would be readily appreciated by those of skill in the art. The universal device 12 can include a data storage component 36 or data store configured to store the virtual ports 30. The universal device selects the virtual ports needed to provide the desired network hardware functionality. The universal device 12 automatically implements the selected virtual ports 30, configuring and transforming the universal device 12 into a feature specific device to provide the desired network hardware functionality. A determination of which of the virtual ports 30 is to be implemented is based on the configuration of the data received at the communication interface 34. Based on this data type, certain virtual ports 30 are implemented appropriately.

Figure 5:
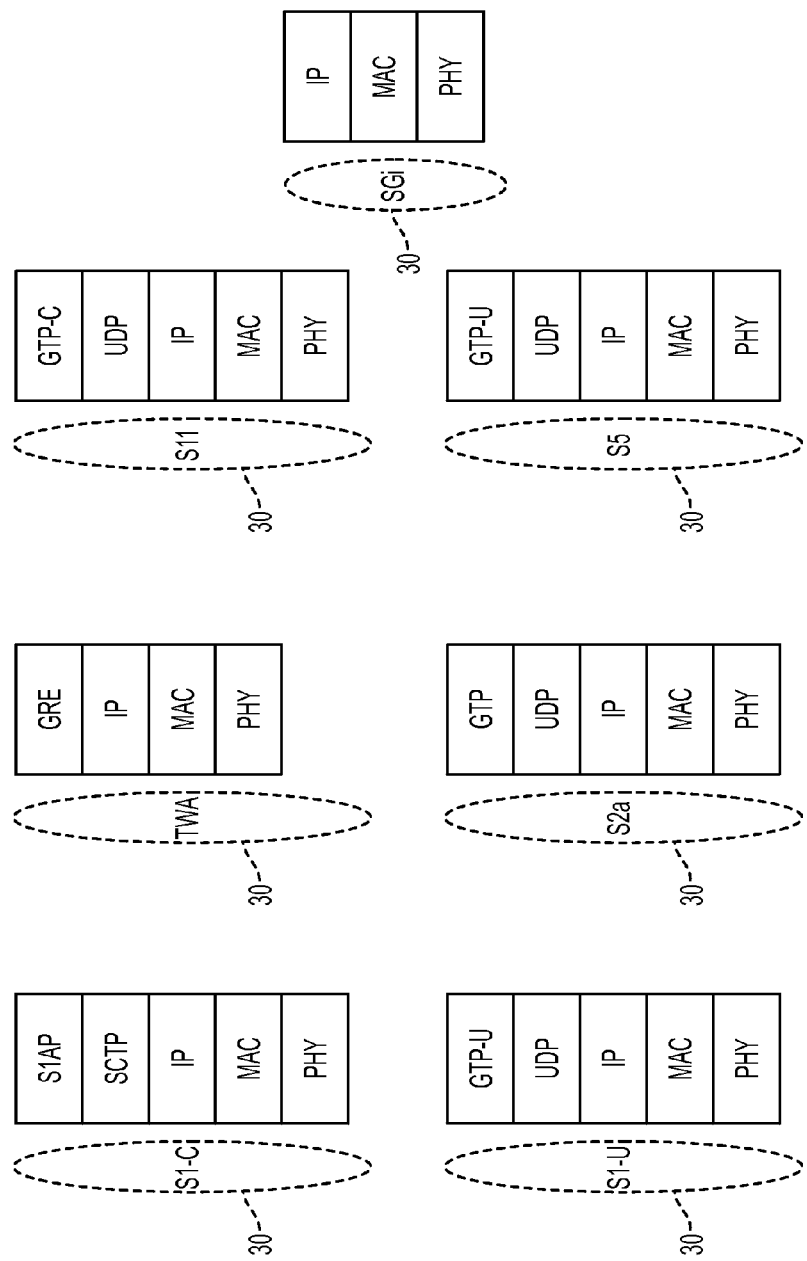
FIG. 5 is a diagrammatic illustration of optional virtual ports that can be utilized by a universal device, according to one aspect of the present invention.

FIG. 5 depicts the protocol configuration of optional virtual ports 30 that can be utilized by the universal device 12. For example, an S1-C port encompasses an S1 Application Protocol (S1AP), Stream Control Transmission Protocol (SCTP), Internet Protocol (IP), Medium Access Control (MAC), and physical layer (PHY). A TWA port encompasses Generic Routing Encapsulation (GRE), IP, MAC, and PHY. An S11 port encompasses GPRS Tunneling Protocol (GTP-C), User Datagram Protocol (UDP), IP, MAC, and PHY. An SGi port encompasses IP, MAC, and PHY. An S1-U port encompasses GTP-U, UDP, IP, MAC, and PHY. An S2a port encompasses GTP, UDP, IP, MAC, and PHY. An S5 port encompasses GTP-U, UDP, IP, MAC, and PHY. Based on the specific combination of protocols (e.g., IP, MAC, and PHY), specific virtual ports are created (e.g., SGi virtual port) by the universal device 12.

Figure 6:
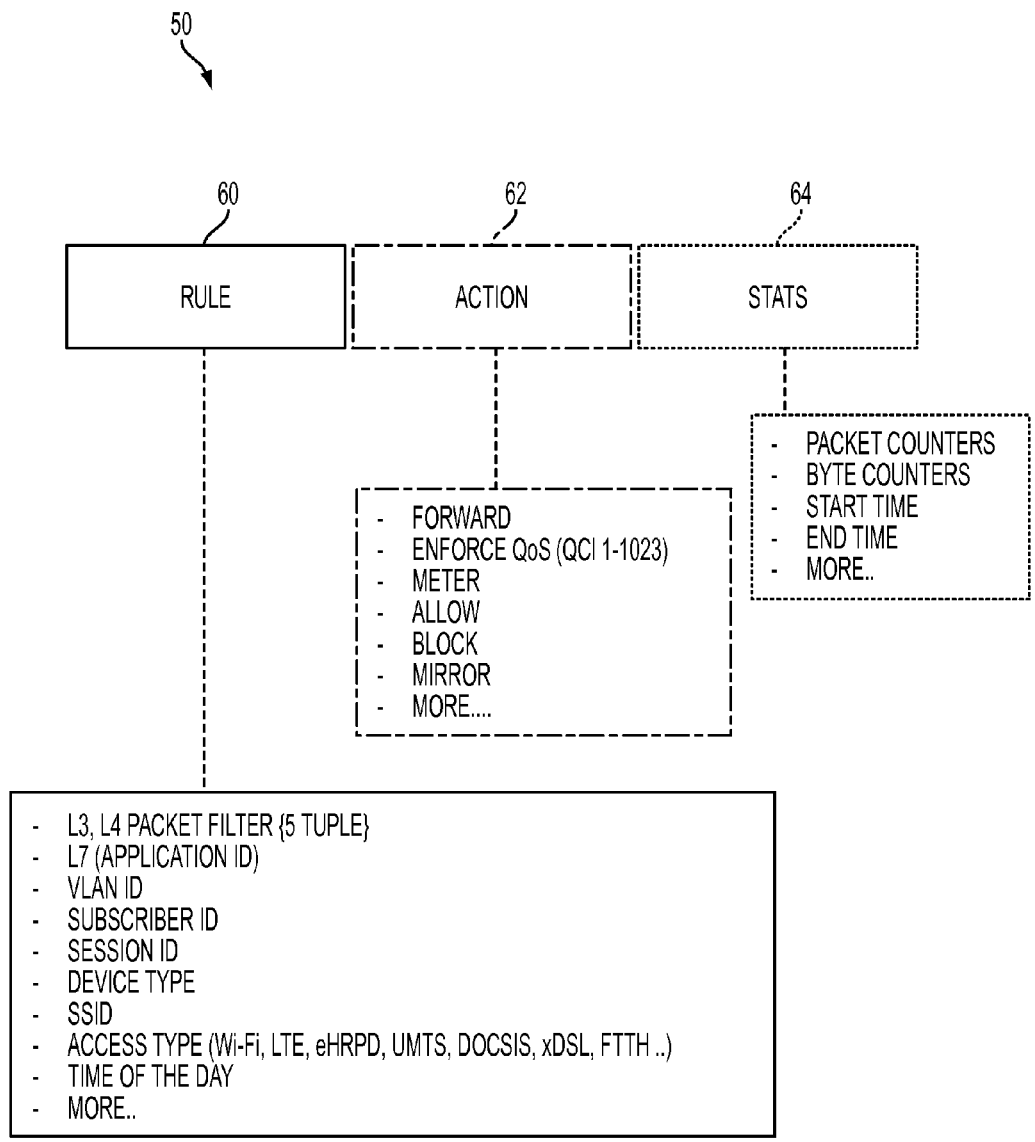
FIG. 6 is a diagrammatic illustration of a workflow pipeline table, according to one aspect of the present invention.

FIG. 6 depicts an example workflow pipeline table 50. The universal device 12 creates the workflow pipeline table 50. Prior to the universal device 12 configuring and transforming itself, the universal device 12 binds selected virtual ports 30 to the workflow pipeline table 50. The workflow pipeline table 50 includes rules relating to particular actions in controlling use of the selected virtual ports 30. In particular, the rules control how the selected virtual ports 30 function as required by the desired network hardware functionality. The rules may also control the selected virtual ports based on user or system preferences. The workflow pipeline table 50 includes data collected statistics relating to the data received by the universal device 12. These statistics may be useful to the workflow pipeline table 50 such that new rules may be implemented to cause specific controls and actions to occur of the virtual ports 30 based on certain statistics (e.g., increase virtual port capacity due to an increase in data flow). In one example, a software application can execute on a processor to create the workflow pipeline table 50 having a number of entries as shown in FIG. 6. The software application can utilize a control protocol to create the rules and the workflow pipeline table 50. The software application can execute on a processor to bind the workflow pipeline table 50 to selected virtual ports 30 so that the virtual ports 30 may be controlled by the workflow pipeline table 50.

In the illustrative example, the workflow pipeline table 50 includes a rule category 60 (rules), action category 62 (actions), and stats category 64 (data collected statistics). For example, the rule category 60 can include such software rules as L3/L4 Packet filter {5 tuple}, L7 (Application ID), VLAN ID, Subscriber ID, Session ID, Device Type, SSID, Access Type (Wi-Fi®, LTE, eHRPD, UMTS, DOCSIS, xDSL, FTTH, etc.), Time of the Day. The action category 62 can include such actions as Forward, Enforce QoS (QCI 1-1023), Meter, Allow, Block, and Mirror that control how the virtual port 30 functions. The stats category 64 can include such data statistics as packet counters, byte counters, start time, and end time.

The universal device 12 can provide a variety of network hardware functionalities. Such desired network hardware functionalities can include a Trusted Wireless Access Gateway (TWAG), Heterogeneous Network Gateway (HetNet GW), Serving Gateway (SGW), Virtual Private LAN Service Gateway (VPLS GW), Mobility Management Entity (MME), Femto Gateway, Serving GPRS Support Node (SGSN), Gateway GPRS Support Node (GGSN), or other network hardware functionalities as appreciated by one of skill in the art.

Figure 7A:
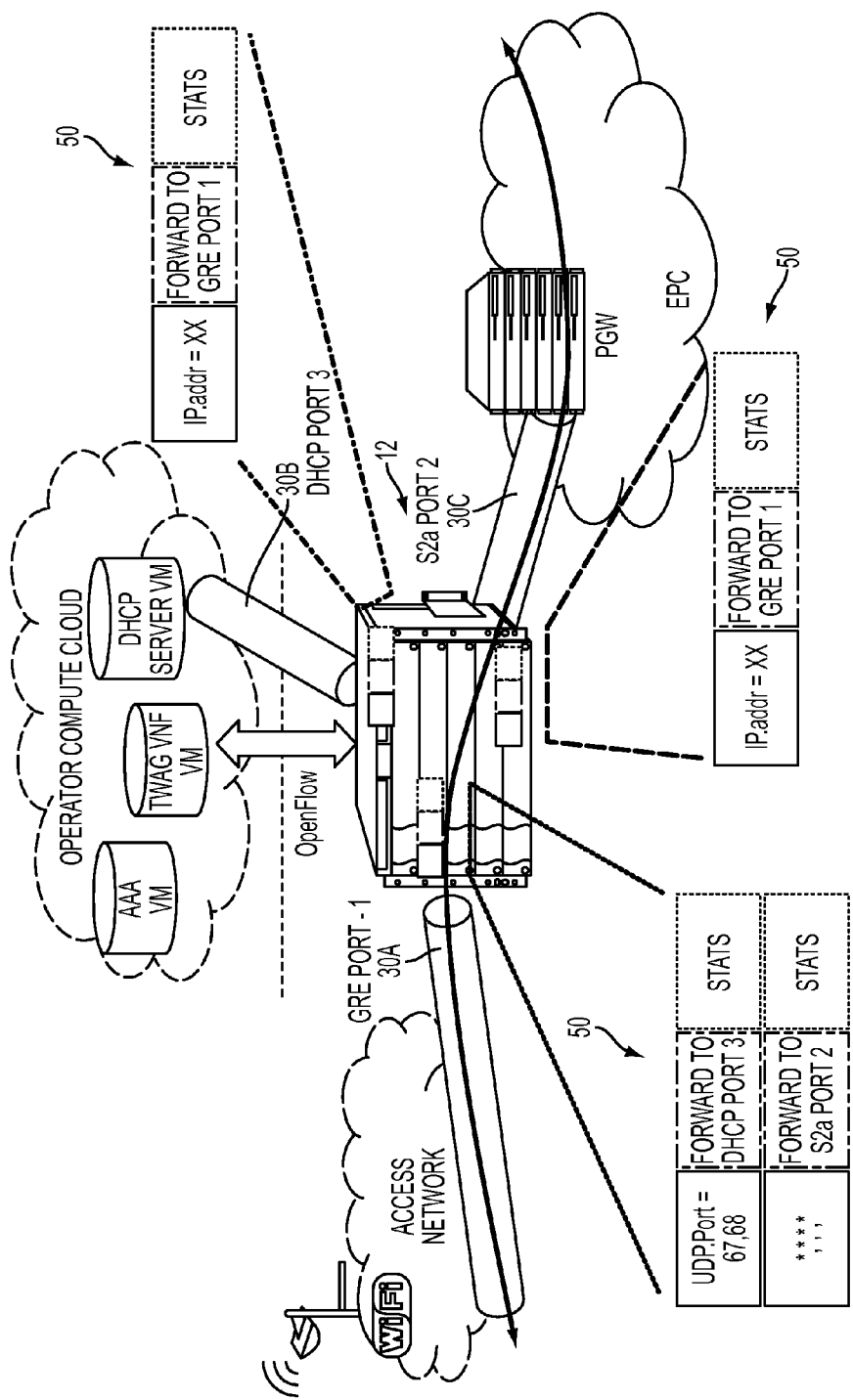
FIG. 7A is an example schematic of a universal device in use as a trusted wireless access gateway (TWAG), according to one aspect of the present invention.
Figure 7B:
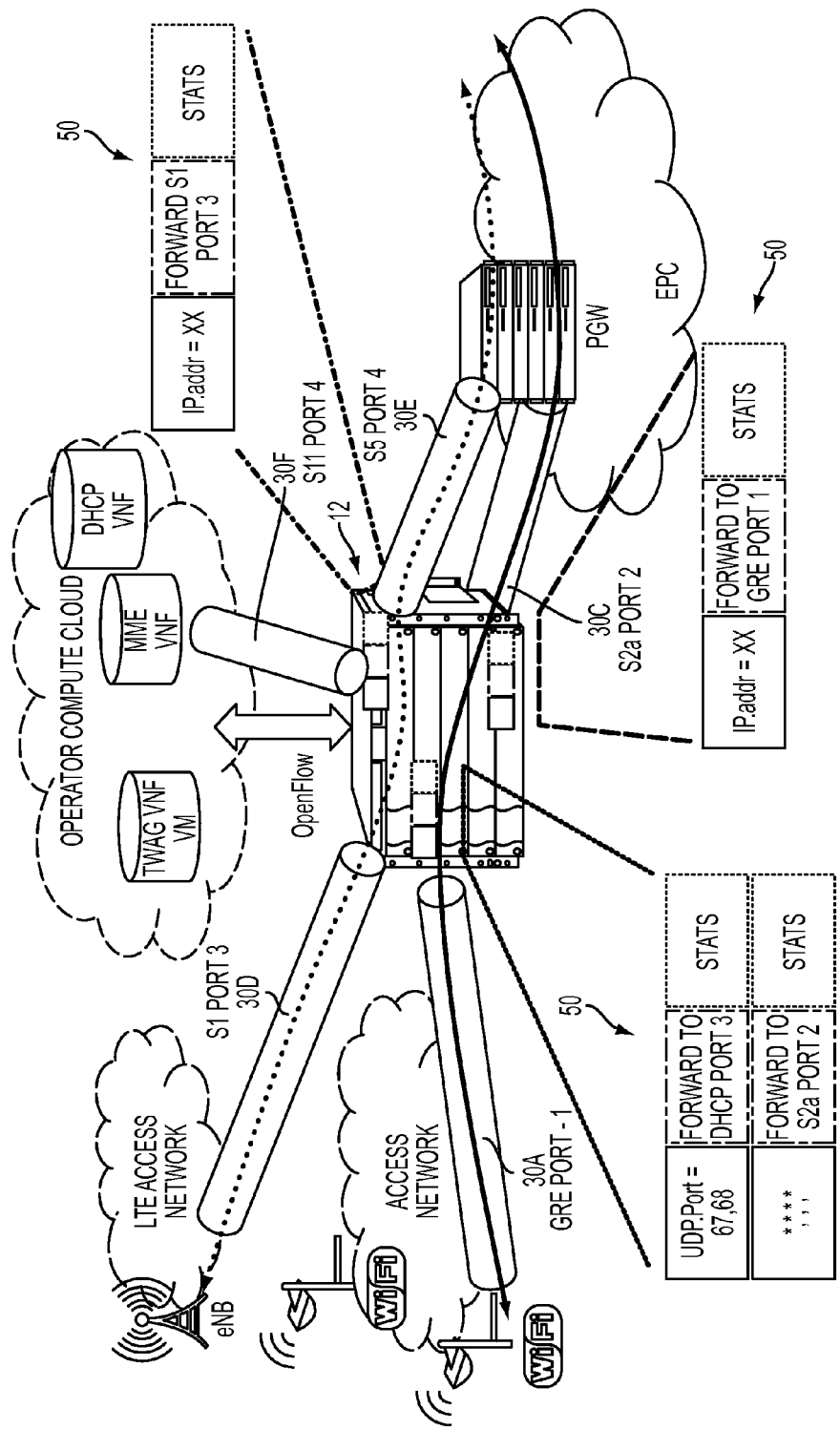
FIG. 7B is an example schematic of another universal device in use as a HetNet gateway (GW), according to one aspect of the present invention.
Figure 7C:
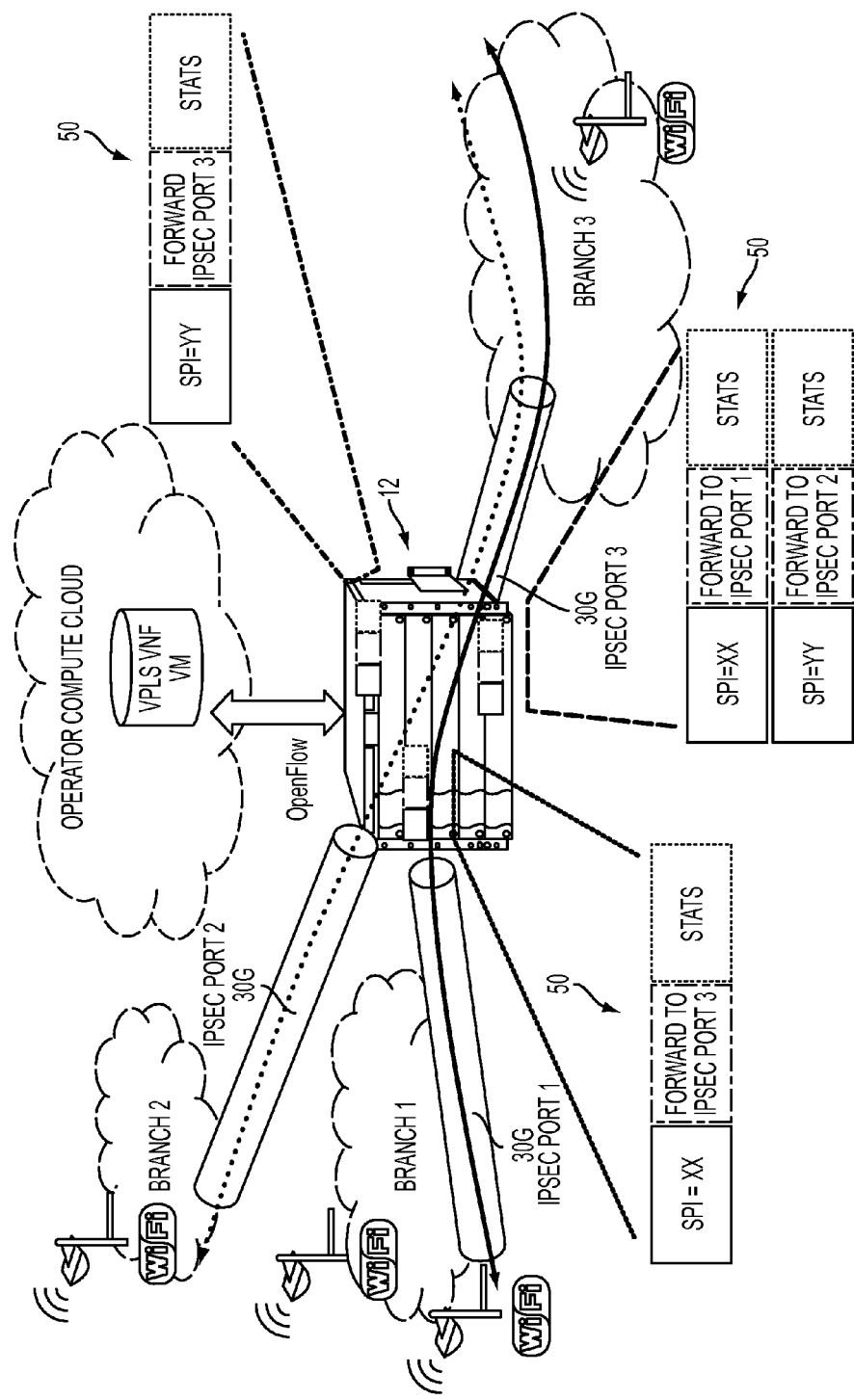
FIG. 7C is an example schematic of another universal device in use as a virtual private LAN service gateway (VPLS GW), according to one aspect of the present invention.

FIGS. 7A through 7C depict three different use cases where the universal device 12 receives data configured for handling by a network hardware device capable of providing the desired network hardware functionality. The universal device 12 in each instance illustrated takes the specific data, automatically configures and transforms itself to process the data, selects the appropriate virtual ports 30 capable of providing the desired network hardware functionality, and processes the data through those ports. The specific input data, virtual ports, and outputs described and illustrated are not intended as limiting of the present invention. Rather, such illustrative examples are provided to contribute to the enablement of the present invention by those of skill in the art using a teaching by example methodology.

FIG. 7A depicts an example of a universal device 12 in use as a trusted wireless access gateway (TWAG) in accordance with aspects of the present invention. Functioning as a TWAG, the universal device 12 requires a GRE virtual port 30A, a DHCP virtual port 30B, and an S2A virtual port 30C. The GRE virtual port 30A communicates with an access network such as WiFi®. The DHCP virtual port 30B communicates with an operator compute cloud (i.e., cloud computing infrastructure) containing virtual machines such as AAA, TWAG VNF, and a DHCP server. Openflow occurs between the cloud computing infrastructure and the software of the universal device 12. As described above and shown in FIG. 7A, as a TWAG, the universal device 12 controls the functioning of each of the virtual ports 30A, 30B, 30C with the bound workflow pipeline tables 50.

FIG. 7B depicts an example of a universal device 12 in use as a heterogeneous network gateway (HetNet GW) (TWAG and serving gateway (SGW)). Functioning as a HetNet GW, the universal device 12 requires a S1 virtual port 30D, GRE virtual port 30A, S2a virtual port 30C, S5 virtual port 30E, and S11 virtual port 30F. The S1 virtual port communicates with an LTE access network (i.e., eNB). The GRE virtual port communicates with an access network (i.e., Wi-Fi®). The S11 virtual port 30F communicates with an operator compute cloud (i.e., cloud computing infrastructure) having virtual machines such as TWAG VNF, MME, and DHCP. The S5 virtual port 30E and S2a virtual port 30C communicate with a PDN gateway (PGW) in an Evolved Packet Core (EPC) on the cloud. Openflow occurs between the cloud computing infrastructure and the software of the universal device 12. As described above and shown in FIG. 7B, as a HetNet GW, the universal device 12 controls the functioning of each of the virtual ports 30D, 30A, 30C, 30E, 30F with the bound workflow pipeline tables 50.

FIG. 7C depicts a universal device 12 in use as a VPLS GW. Functioning as a VPLS GW, the universal device 12 requires an first IPSEC virtual port 30G, second IPSEC virtual port 30G, and a third IPSEC virtual port 30G. The first IPSEC virtual port 30G communicates with a first branch of Wi-Fi®. The second IPSEC virtual port 30G communicates with a second branch of Wi-Fi®. The third IPSEC virtual port 30G communicates with a third branch of Wi-Fi®. Openflow occurs between the software of the universal device to an operator compute cloud (i.e., cloud computing infrastructure) having a VPLS virtual network feature (VNF) virtual machine. As described above and shown in FIG. 7C, as a VPLS GW, the universal device 12 controls the functioning of each of the virtual ports 30G with the bound workflow pipeline tables 50.

Figure 8:
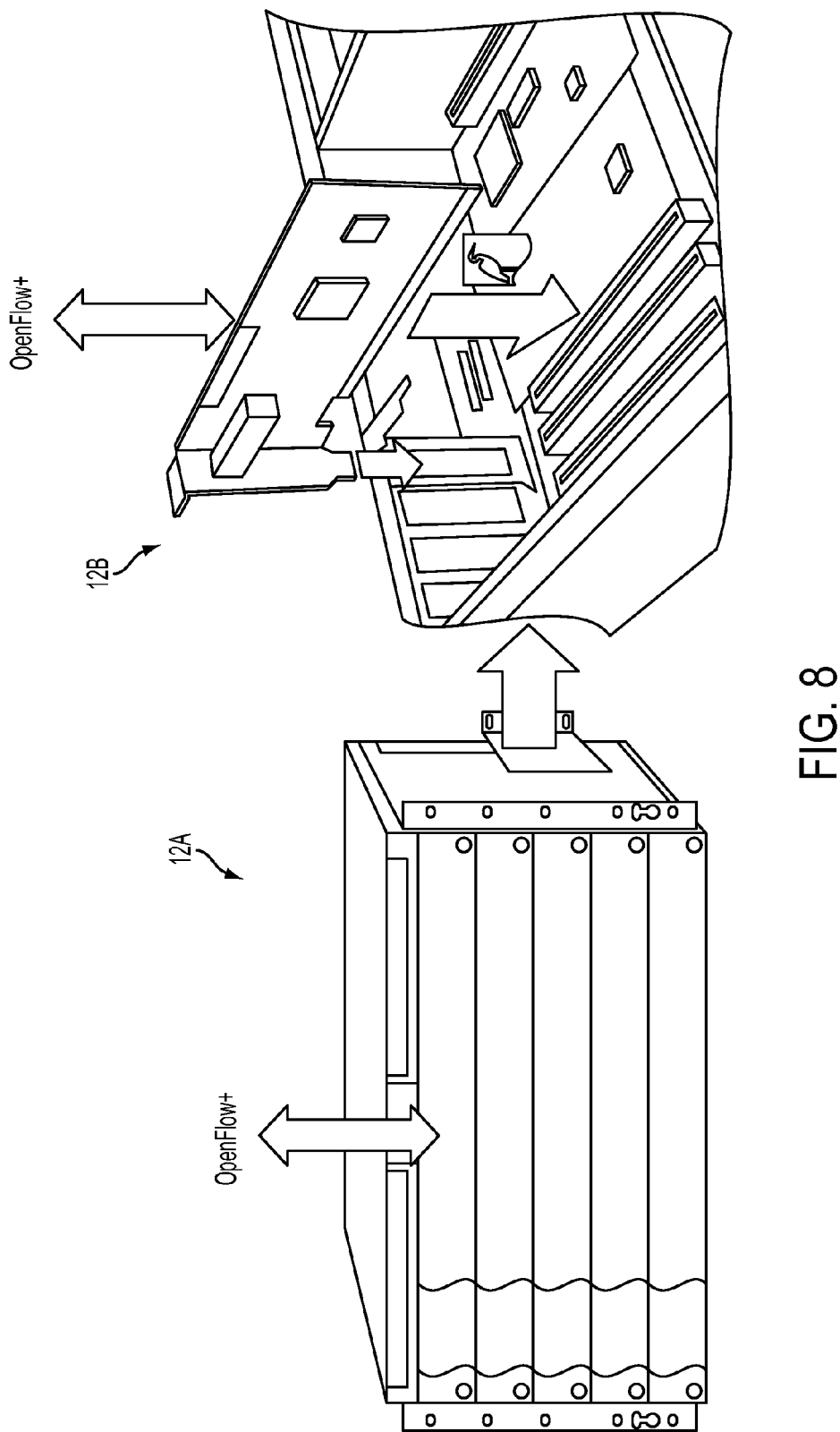
FIG. 8 is a diagrammatic illustration of the universal device capable of functioning as two different hardware devices, according to one aspect of the present invention.

FIG. 8 illustrates the universal device 12 as two different types of hardware in accordance with two different implementations of the present invention. The universal device 12 can be a stand-alone network virtualization hardware device 12A. The universal device 12 can likewise be a network interface card 12B. The universal device 12 utilizes a data plane NFV hypervisor or program which virtualizes the data plane and software defined networking (SDN) APIs data plane interaction on a cloud computing infrastructure. The high performance stand-alone network virtualization hardware device 12A can include telecommunication access methods (TCAMs), traffic shapers (TME), filters, and field-programmable gate array (FPGA) QoS to provide the functions described above. Alternatively, the network interface card 12B can be a high performance closed user group (CUG) peripheral component interconnect (PCI) network interface card (NIC). This CUG PCI NIC can include TCAMs, FPGA based traffic shaper known as packet shaping, NFV/SDN (openflow) support, and line rate QoS. Those of skill in the art will appreciate that the aforementioned list of parts is by no means intended to be limiting of the invention, as multiple different component configurations are possible for use in conjunction with the present invention. In both implementations (stand-alone network virtualization hardware device 12A or network interface card 12B), in one example the universal device 12 can function with about 30 Gbps throughput and about 30 million packets per second. Additionally, the universal device 12, 12A, 12B can include similar options for physical communication interfaces as discussed above.

Figure 9:
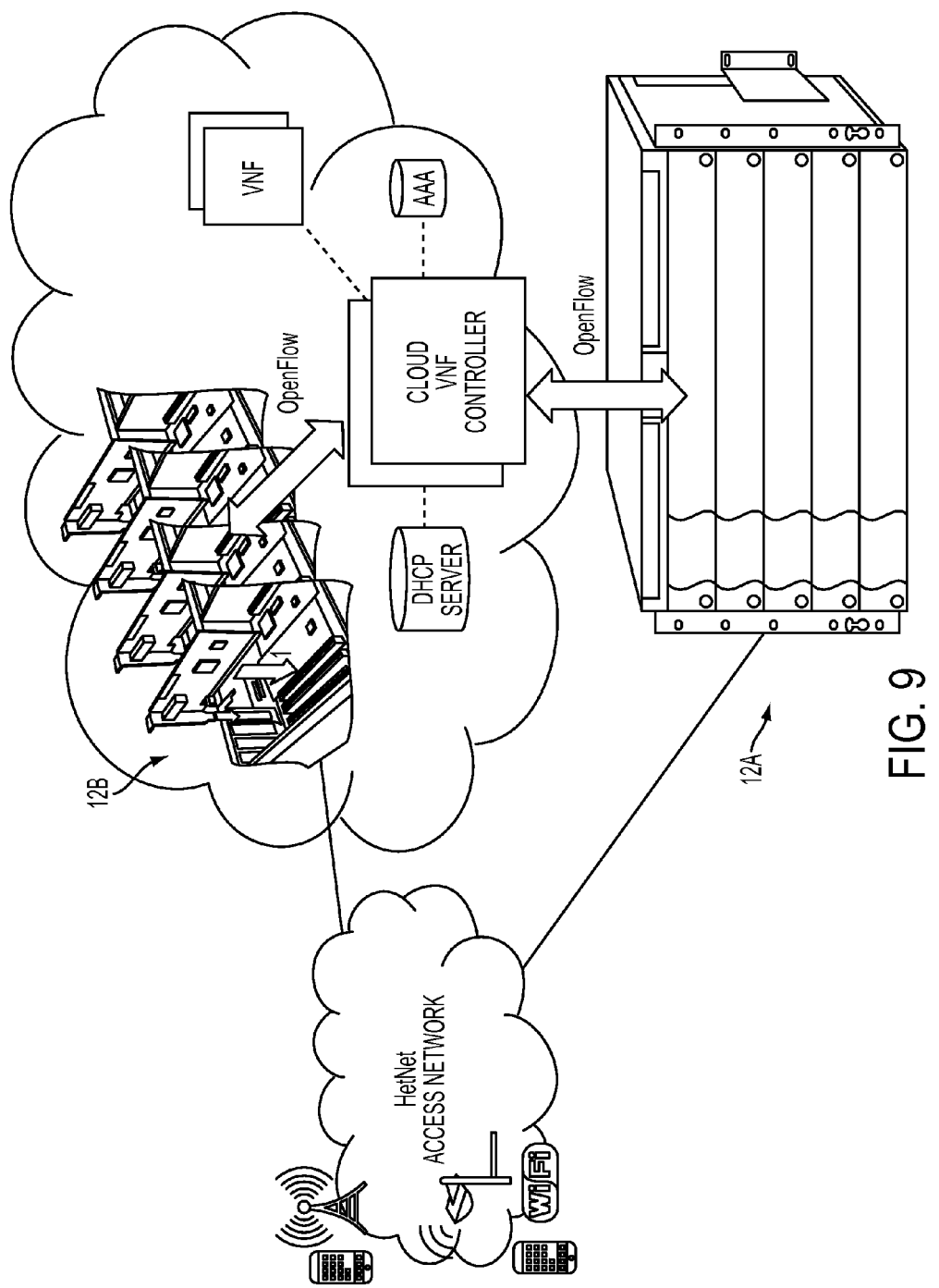
FIG. 9 is an example of the universal device as a multi-platform data plane, according to one aspect of the present invention.

FIG. 9 is a universal device that can form as a multi-platform data plane (stand-alone network virtualization hardware device 12A and/or network interface card 12B as described in FIG. 8). In this example, stand-alone network virtualization hardware device 12A such as NFV hardware functions may co-exist with one or more (e.g., cluster) network interface cards 12B (e.g., CUG PCI NIC). The stand-alone network virtualization hardware device 12A and/or the network interface cards 12B communicate with a heterogeneous (HetNet) Access Network. The stand-alone network virtualization hardware device 12A and network interface cards 12B have openflow with a cloud virtual network feature (VNF) controller thus communicating with the cloud computing infrastructure. In this example, the VNF controller communicates with a DHCP server, AAA, and virtual network feature (VNF). Whether the universal device is a stand-alone network virtualization hardware device 12A or a network interface card 12B, it communicates with the cloud computing infrastructure for configuring and handling data from the HetNet Access Network.

Figure 10:
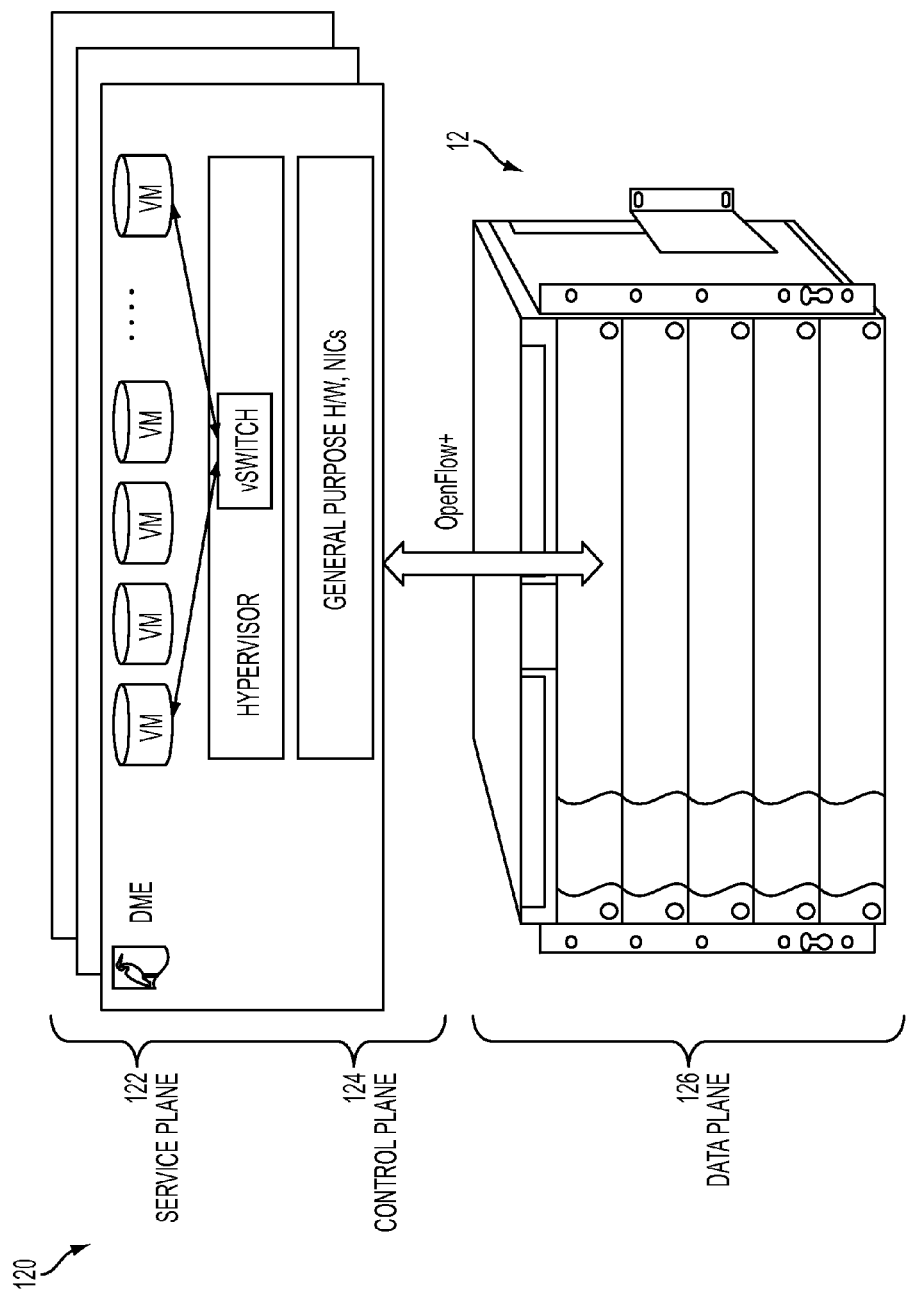
FIG. 10 is a schematic illustration of the components of the universal device system, according to one aspect of the present invention.

FIG. 10 depicts components of the universal device system 120. In particular, the universal device system 120 includes a service plane 122, control plane 124, and data plane 126. The data plane 126 is the universal device 12 which has openflow with general purpose hardware, NICs, and hypervisor (e.g., vSwitch) which are part of the control plane 124. The control plane 124 communicates with the service plane 122 which can include many virtual machines. The data plane 126 (hardware) is independent from the control plane 124 (software layer). This allows the universal device 12 to be reprogrammable and not limited to specific hardware. The data plane 126 is common or universal such that it can be programmed to perform any network hardware functionality by programming nodes so that the universal device 12 has the required virtual ports as described above. In particular, the control plane 124 and service plane 122 occur on a cloud computing infrastructure. The control plane 124 interacts separately with the data plane 124 of the universal device 12 such that the universal device 12 can be manipulated to function as many different network hardware devices depending on data received. As data is received from the network, the control plane 126 can choose a desired network hardware functionality. This desired network hardware functionality performs as a virtual machine in the service plane 122.

Figure 11:
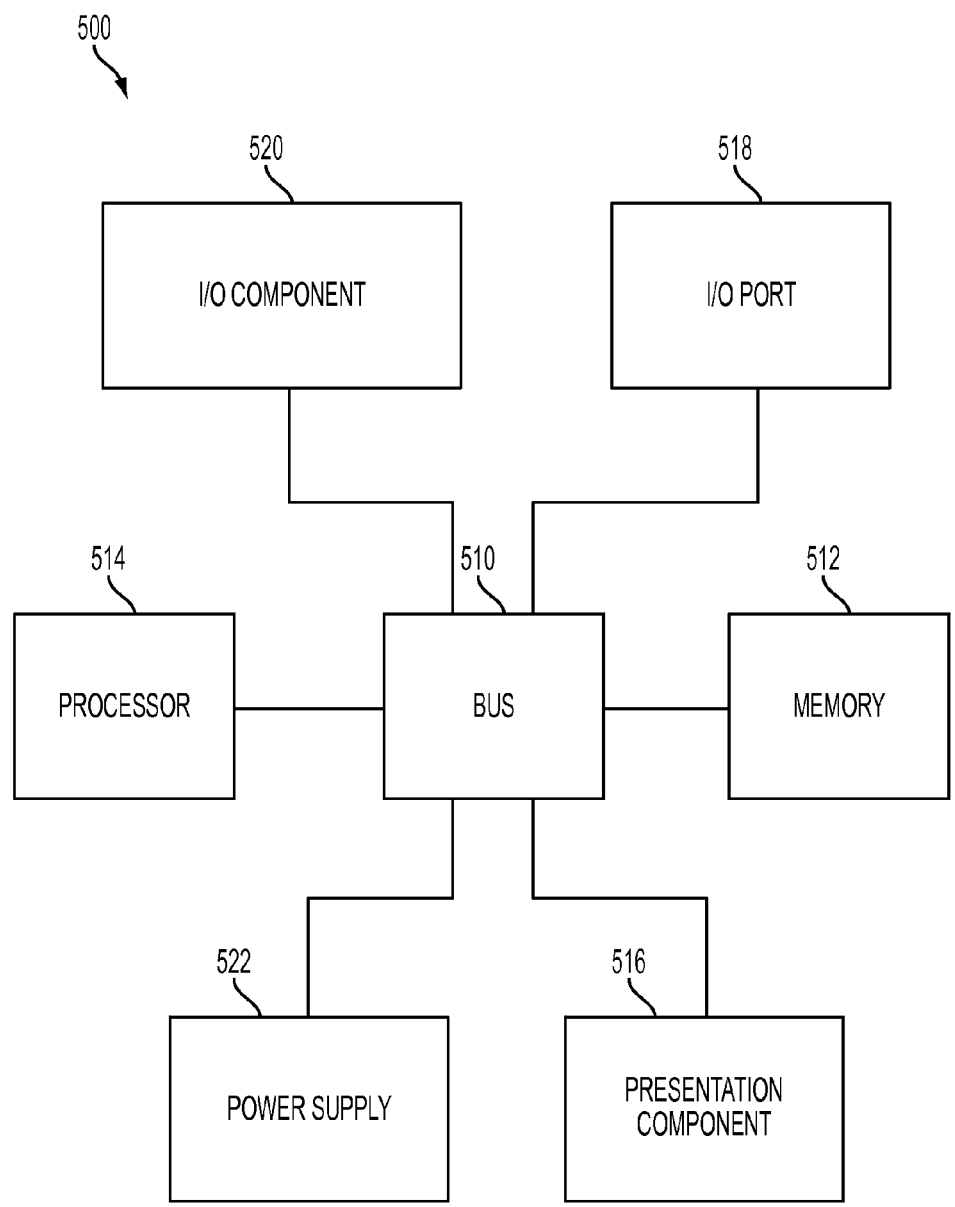
FIG. 11 is a schematic view of a computing device or system, suitable for implementing the systems and methods of the present invention.

FIG. 11 illustrates an example of a computing device 500 which can provide computing or processing functionality for the cloud computing infrastructure, the universal device, and any other processing functionality described herein and utilized in the implementation of aspects of the illustrative methods and systems of the present invention. The computing device 500 is merely an illustrative example of a suitable computing environment and in no way limits the scope of the present invention. A "computing device," as represented by FIG. 11, can include a "workstation," a "server," a "laptop," a "desktop," a "hand-held device," a "mobile device," a "tablet computer," or other computing devices, as would be understood by those of skill in the art. Given that the computing device 500 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 500 can include a bus 510 that can be coupled to one or more of the following illustrative components, directly or indirectly: a memory 512, one or more processors 514, one or more presentation components 516, input/output ports 518, input/output components 520, and a power supply 522. One of skill in the art will appreciate that the bus 510 can include one or more busses, such as an address bus, a data bus, or any combination thereof. One of skill in the art additionally will appreciate that, depending on the intended applications and uses of a particular embodiment, multiple components can be implemented by a single device. Similarly, in some instances, a single component can be implemented by multiple devices. As such, FIG. 11 is merely illustrative of an exemplary computing device that can be used to implement one or more embodiments of the present invention, and in no way limits the invention.

The computing device 500 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 500.

The memory 512 can include computer-storage media in the form of volatile and/or nonvolatile memory. The memory 512 can be removable, non-removable, or any combination thereof. Exemplary hardware devices are devices such as hard drives, solid-state memory, optical-disc drives, and the like. The computing device 500 can include one or more processors 514 that read data from components such as the memory 512, the various I/O components 520, etc. Presentation component(s) 516 present data indications to a user or other device. Exemplary presentation components 516 include a display device, speaker, printing component, vibrating component, etc. The I/O ports 518 can allow the computing device 500 to be logically coupled to other devices, such as I/O components 520. Some of the I/O components 520 can be built into the computing device 500. Examples of such I/O components 520 include a microphone, joystick, recording device, game pad, satellite dish, scanner, printer, wireless device, Bluetooth® device, networking device, and the like.

One of skill in the art will appreciate a wide variety of ways to modify and alter the system and method of FIGS. 1-11, as well as the various components with which it interacts. For example, the one or more computing systems can be implemented according to any number of suitable computing system structures. Furthermore, some or all of the information contained in the one or more data sources alternatively can be stored in one or more remote databases (e.g., cloud computing infrastructure such as cloud databases, virtual databases, and any other remote database).

In some embodiments, it may be desirable to implement the method and system using multiple iterations of the depicted modules, controllers, and/or other components, as would be appreciated by one of skill in the art. Furthermore, while some modules and components are depicted as included within the system, it should be understood that, in fact, any of the depicted modules alternatively can be excluded from the system and included in a different system. One of skill in the art will appreciate a variety of other ways to expand, reduce, or otherwise modify the system upon reading the present specification.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A computer-implemented method for automatically configuring and transforming a universal device into a feature specific device to provide desired network hardware functionality, the method comprising:
   the universal device receiving data configured for handling by a network hardware device capable of providing the desired network hardware functionality;
   the universal device identifying, based on the data received, the desired network hardware functionality from a plurality of network hardware functionalities;
   the universal device selecting one or more virtual ports from a plurality of virtual ports, the selected one or more virtual ports providing the desired network hardware functionality; and
   the universal device automatically configuring and transforming itself into a feature specific device to provide the desired network hardware functionality by implementing the selected one or more virtual ports to handle the data received;
   wherein the universal device, configured as the feature specific device, is enabled by a cloud computing infrastructure providing the desired network hardware functionality from one or more virtual machines; and
   wherein the one or more virtual ports are utilized to communicate with the one or more virtual machines in the cloud computing infrastructure through a communications protocol giving access to a data plane that occurs between the one or more virtual machines in the cloud computing infrastructure and software of the universal device, and the universal device controls functioning of each of the one or more virtual ports to provide the desired network hardware functionality.

2. The method of claim 1, wherein implementing the selected one or more virtual ports further comprises routing the data through the selected one or more virtual ports for handling to provide the desired network hardware functionality.

3. The method of claim 1, wherein the plurality of virtual ports comprise a Generic Routing Encapsulation (GRE), S1-c, S1-u, S3, S4, S5, S8, S9, S10, S11, IP Security (IPSec), Transport Layer Security (TLS), Gx, Gy, S2a, SGi, or Dynamic Host Configuration Protocol (DHCP).

4. The method of claim 1, wherein the universal device controls functioning of each of the one or more virtual ports by creating a workflow pipeline table prior to the universal device automatically configuring and transforming itself.

5. The method of claim 4, further comprising, prior to the step of the universal device automatically configuring and transforming itself, the universal device binding the selected one or more virtual ports to the workflow pipeline table.

6. The method of claim 5, wherein the workflow pipeline table comprises a plurality of rules relating to particular actions in controlling a use of the selected one or more virtual ports.

7. The method of claim 6, wherein the workflow pipeline table comprises a plurality of data collected statistics relating to the data received by the universal device.

8. The method of claim 1, wherein the desired network hardware functionality comprises a Trusted Wireless Access Gateway (TWAG), Heterogeneous Network Gateway (HetNet GW), Serving Gateway (SGW), Virtual Private LAN Service Gateway (VPLS GW), Mobility Management Entity (MME), Femto Gateway, Serving GPRS Support Node (SGSN), or Gateway GPRS Support Node (GGSN).

9. The method of claim 1, wherein the universal device is a network interface card.

10. The method of claim 1, wherein the universal device is a stand-alone network virtualization hardware device.

11. The method of claim 1, wherein the step of the universal device automatically configuring and transforming itself into a feature specific device to provide the desired network hardware functionality further comprises programming the universal device using open programming language.

12. The method of claim 1, wherein the step of the universal device automatically configuring and transforming itself into a feature specific device to provide the desired network hardware functionality comprises programming one or more nodes that are programmable and reprogrammable with at least one virtual port in such a way that the universal device is programmable with the one or more virtual ports required to provide the network hardware functionality.

13. A universal device hardware, comprising:
   a communication interface configured to receive data configured for handling by a network hardware device having a desired network hardware functionality;
   a data storage component configured to store a plurality of virtual ports;
   wherein the universal device hardware selects one or more virtual ports from the plurality of virtual ports, the selected one or more virtual ports being capable of providing the desired network hardware functionality;
   wherein the universal device hardware automatically implements the selected one or more virtual ports, configuring and transforming the universal device hardware into a feature specific device to provide the desired network hardware functionality;
   wherein the universal device, configured as the feature specific device, is enabled by a cloud computing infrastructure providing the desired network hardware functionality from one or more virtual machines;
   wherein the one or more virtual ports are utilized to communicate with the one or more virtual machines in the cloud computing infrastructure through a communications protocol giving access to a data plane that occurs between the one or more virtual machines in the cloud computing infrastructure and software of the universal device, and the universal device controls functioning of each of the one or more virtual ports to provide the desired network hardware functionality; and wherein a determination of which of the one or more virtual ports is implemented is based on configuration of the data received at the communication interface and as provided by the one or more virtual machines.

14. A system for automatically configuring and transforming a universal device into a feature specific device to provide desired network hardware functionality, the system comprising:

a receiving module configured to receive data that is configured for handling by a network hardware device capable of providing the desired network hardware functionality;

a functionality module configured to identify, based on the data received, the desired network hardware functionality from a plurality of network hardware functionalities, wherein the functionality module is configured to select one or more virtual ports capable of providing the desired network hardware functionality;

a virtual connect module configured to automatically configure the universal device to provide the desired network hardware functionality by implementing the selected one or more virtual ports to handle the data received by providing the desired network hardware functionality;

wherein the receiving module, the functionality module, and the virtual connect module are executed by a plurality of processors comprised in a cloud computing infrastructure; and wherein the system automatically configures and transforms the universal device into the feature specific device to provide the desired network hardware functionality;

wherein the one or more virtual ports are utilized to communicate with one or more virtual machines in the cloud computing infrastructure to provide the desired network hardware functionality wherein the universal device, configured as the feature specific device, is enabled by the cloud computing infrastructure providing the desired network hardware functionality from one or more virtual machines;

a communication protocol gives access to a data plane that occurs between the one or more virtual machines in the cloud computing infrastructure and the software of universal device; and wherein the one or more virtual ports communicate with the one or more virtual machines in the cloud computing infrastructure through the communications protocol, and the universal device controls functioning of each of the one or more virtual ports.

15. A software application implemented method for automatically configuring and transforming a universal device into a feature specific device to provide desired network hardware functionality, the method comprising:

the universal device receiving data configured for handling by a network hardware device capable of providing the desired network hardware functionality;

a software application executing on a processor identifying, based on the data received, the desired network hardware functionality from a plurality of network hardware functionalities;

the software application executing on a processor selecting one or more virtual ports capable of providing the desired network hardware functionality;

the software application executing on a processor automatically configuring and transforming the universal device into a feature specific device to provide the desired network hardware functionality by implementing the selected one or more virtual ports to handle data received;

wherein at least a portion of the software application is executed by a plurality of processors comprised in a cloud computing infrastructure;

wherein the one or more virtual ports are utilized to communicate with one or more virtual machines in the cloud computing infrastructure to provide the desired network hardware functionalities;

wherein the universal device, configured as the feature specific device, is enabled by the cloud computing infrastructure providing the desired network hardware functionality from one or more virtual machines;

a communication protocol gives access to a data plane that occurs between the one or more virtual machines in the cloud computing infrastructure and the software of universal device; and wherein the one or more virtual ports communicate with the one or more virtual machines in the cloud computing infrastructure through the communications protocol, and the universal device controls functioning of each of the one or more virtual ports.

16. The method of claim 15, further comprising the software application executing on a processor creating a workflow pipeline table, wherein the workflow pipeline table comprises a plurality of entries.

17. The method of claim 16, wherein the step of the software application executing on a processor creating the workflow pipeline table comprises the software application utilizing a control protocol to create rules and the workflow pipeline table.

18. The method of claim 16, further comprising the software application executing on a processor binding the workflow pipeline table to the selected one or more virtual ports.

* * * * *